United States Patent
Chiang

(10) Patent No.: US 9,787,810 B1
(45) Date of Patent: Oct. 10, 2017

(54) ANGLE ADJUSTING MECHANISM FOR TELEPHONE

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventor: Qiao-Lun Chiang, New Taipei (TW)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/242,736

(22) Filed: Aug. 22, 2016

(30) Foreign Application Priority Data

May 28, 2016 (TW) .............................. 105116783 A

(51) Int. Cl.
- *H04M 1/00* (2006.01)
- *H04M 1/06* (2006.01)
- *F16M 11/20* (2006.01)

(52) U.S. Cl.
CPC .......... *H04M 1/06* (2013.01); *F16M 11/2021* (2013.01)

(58) Field of Classification Search
CPC ....... H04M 1/04; H04M 1/06; F16M 11/2021
USPC .................. 379/446–449, 454–455
See application file for complete search history.

(56) References Cited

U.S. PATENT DOCUMENTS

| 5,708,708 A | 1/1998 | Sacristan |
| 5,732,355 A | 3/1998 | Lipp et al. |
| 6,741,703 B1 * | 5/2004 | Clour ...................... H04M 1/08 379/447 |
| 7,970,126 B2 * | 6/2011 | Ahn ..................... H04M 1/0295 345/156 |
| 8,750,495 B2 | 6/2014 | Suzuki et al. |
| 2005/0069126 A1 | 3/2005 | Xue |
| 2009/0175439 A1 * | 7/2009 | Jian ........................ H04M 1/08 379/433.06 |
| 2014/0285150 A1 * | 9/2014 | Toh ......................... H04M 1/04 320/115 |
| 2014/0306074 A1 | 10/2014 | Zhang et al. |

FOREIGN PATENT DOCUMENTS

| CN | 2938603 Y | 8/2007 |
| CN | 201114234 Y | 9/2008 |
| TW | 201304492 A1 | 1/2013 |
| TW | M455309 U1 | 6/2013 |
| TW | 201410123 A | 3/2014 |

* cited by examiner

*Primary Examiner* — Tuan D Nguyen
(74) *Attorney, Agent, or Firm* — Steven Reiss

(57) ABSTRACT

An angle adjusting mechanism for a mouthpiece bearing portion of a telephone includes a hinge, a guiding member, a connecting member, a pushing member, a first wheel, and a second wheel. The hinge and the guiding member are fixed on opposite ends of the connecting member. The first wheel is fixed on the pushing member, and the second wheel is fixed on the mouthpiece bearing portion. The first wheel and the second wheel engage together and an end of the pushing member is connected to the guiding member. The hinge can rotate to slide the pushing member to rotate the first wheel. The second wheel turns to achieve a constant angle for the handset bed even if main body of telephone is propped up to an angle from a supporting surface.

20 Claims, 6 Drawing Sheets

ANGLE ADJUSTING MECHANISM FOR TELEPHONE

FIELD

The subject matter relates to an angle adjusting mechanism for a telephone, and particularly relates an angle adjusting mechanism for adjusting an angle of the handset bed of a telephone.

BACKGROUND

A traditional telephone includes a base station, a handset, and a rotational support. The telephone is placed on a flat surface, the support is used for supporting the base station forming an angle between the base station and the flat surface. The angle between the base station and the flat surface is increased as an angle between the support and the flat surface increases. At the same time, the vertical weight of the handset in a direction perpendicular to the base station is decreased. Thus, when the angle between the support and the flat surface reaches a critical value, the vertical weight of the handset in a direction perpendicular to the base station is not large enough for ending a call when the handset is replaced in the handset bed. Therefore, there is room for improvement within the art.

BRIEF DESCRIPTION OF THE DRAWINGS

Implementations of the present technology will now be described, by way of example only, with reference to the attached figures.

DETAILED DESCRIPTION

Figure 1:
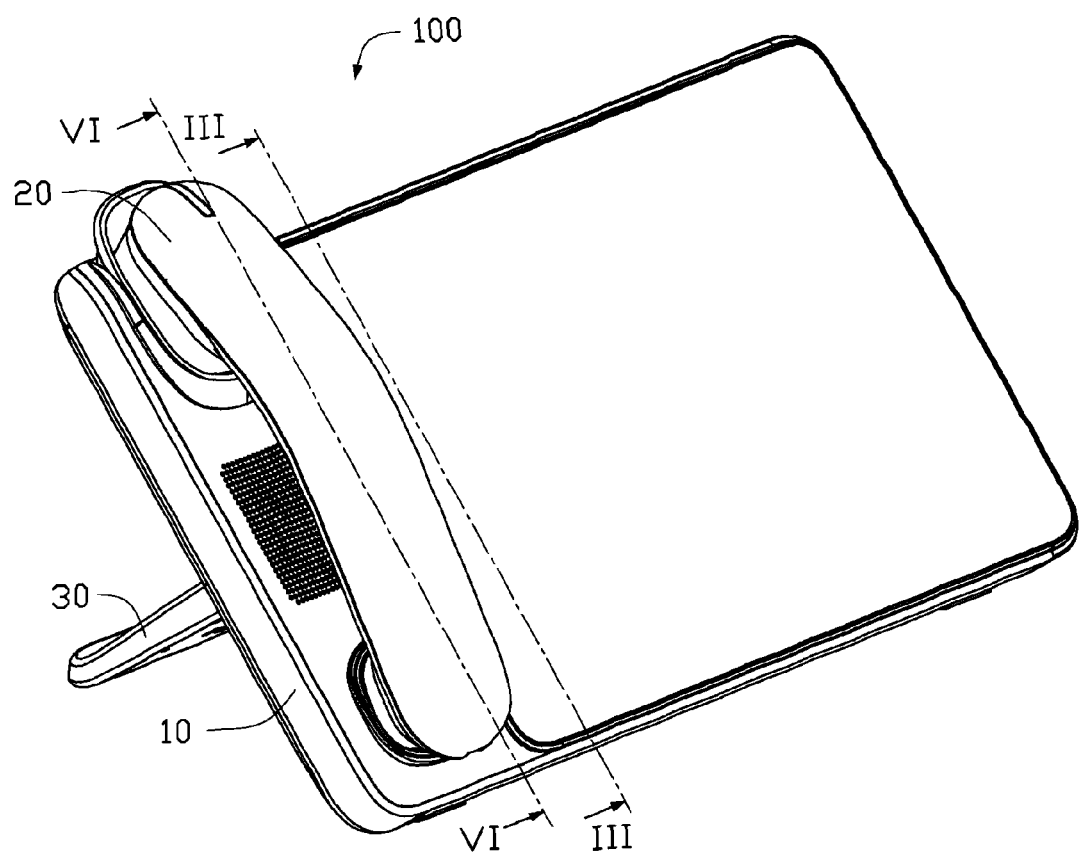
FIG. 1 illustrates an assembled, isometric view of a telephone in accordance with an exemplary embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

Figure 2:
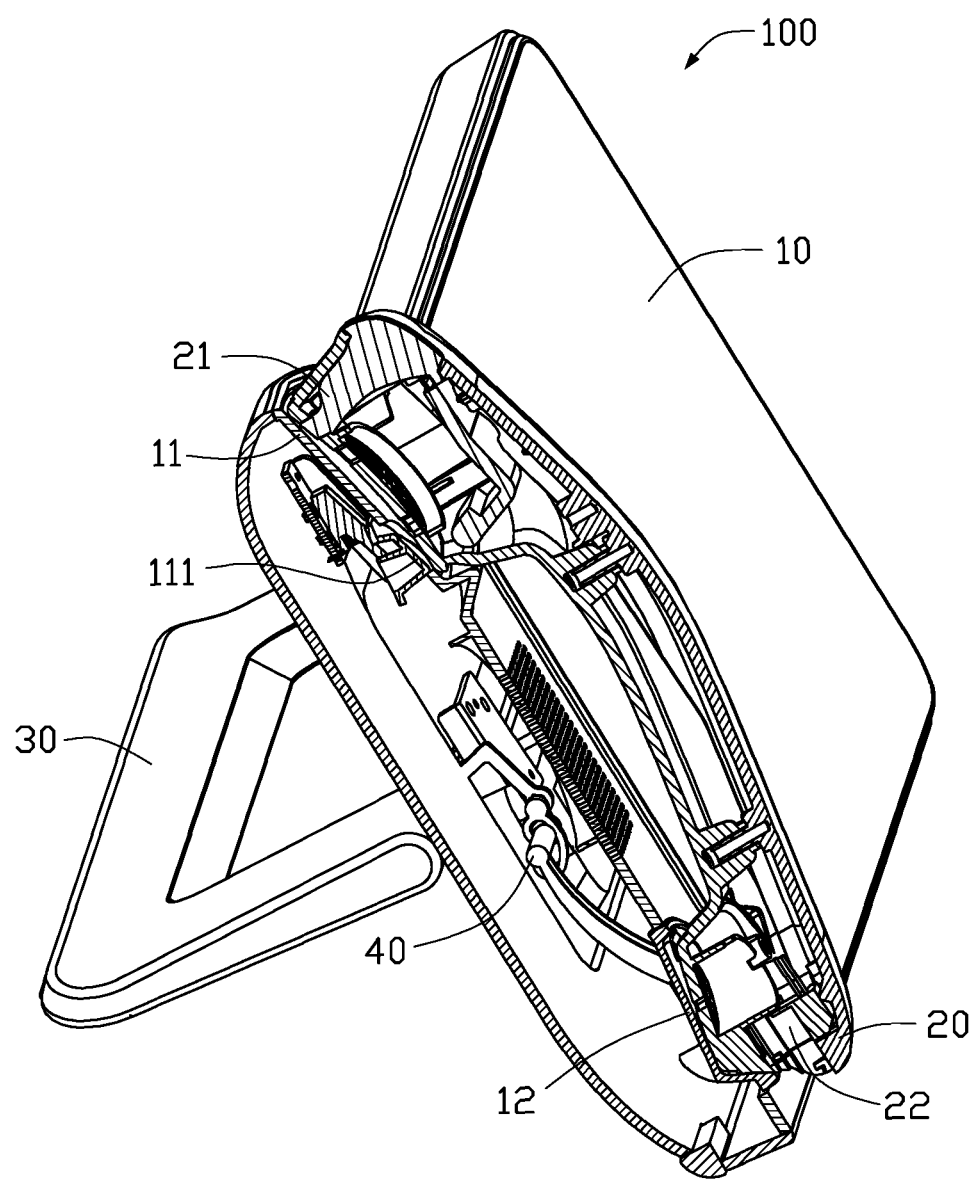
FIG. 2 is a cut-away view of the telephone in FIG. 1.
Figure 3:
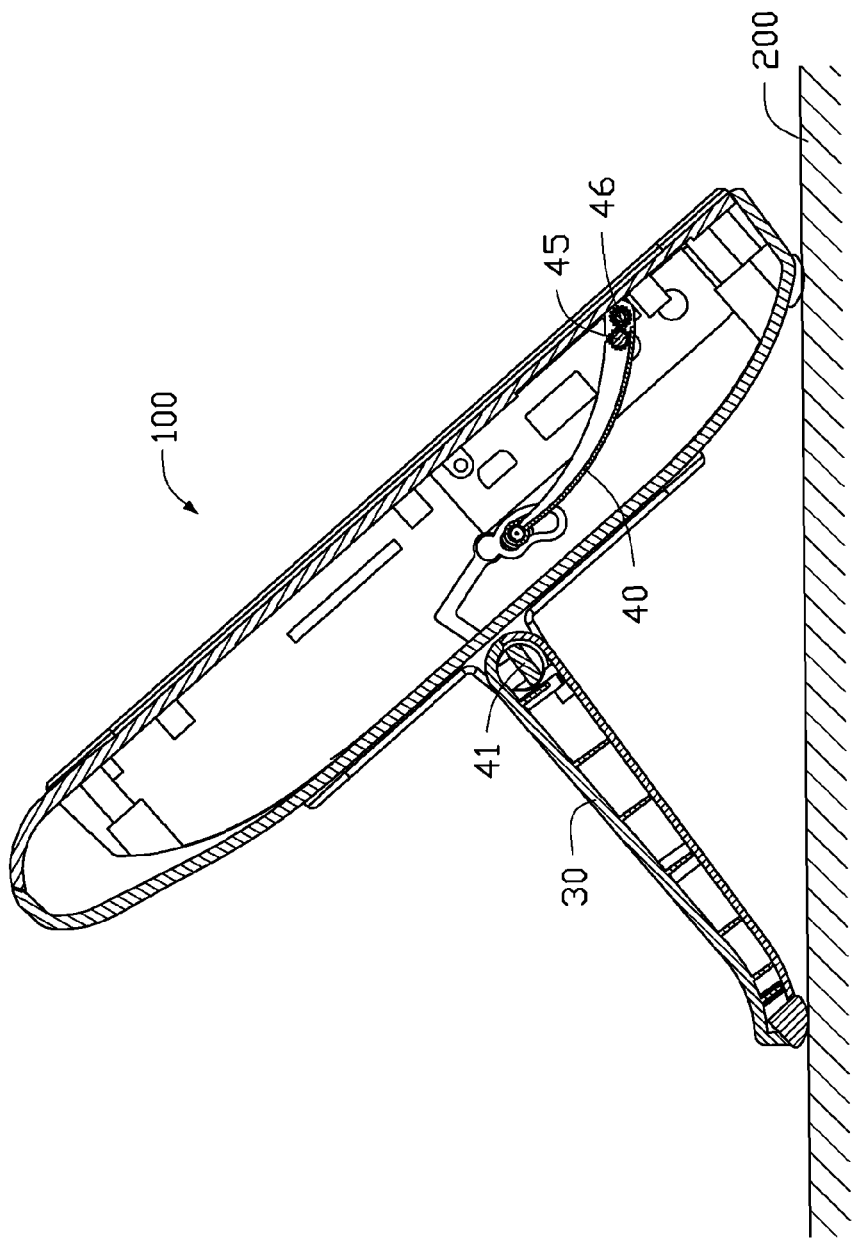
FIG. 3 illustrates a cross-section view of the telephone in FIG. 1, taken along a line thereof.

Referring to FIGS. 1-3, a telephone 100 of an exemplary embodiment of the present disclosure includes a base station 10, a handset 20 coupled with the base station 10, a support 30, and an angle adjusting mechanism 40. The handset 20 is detachably arranged on the base station 10. The support 30 is mounted on a back of the base station 10. The support 30 is used for adjusting an angle between the base station 10 and a flat surface 200 used for propping up the telephone 100. The angle adjusting mechanism 40 is received in the base station 10 and the support 30.

The handset 20 includes an earpiece 21 and a mouthpiece 22. The base station 10 includes an earpiece bearing portion 11 and a mouthpiece bearing portion 12. The earpiece 21 is separately placed in the earpiece bearing portion 11, and the mouthpiece 22 is separately placed in the mouthpiece bearing portion 12. The telephone 100 further includes a hang-up button 111 installed in the earpiece bearing portion 11. When the telephone 100 is not being used, the handset 20 remains on the base station 10, and the hang-up button 111 is in a state of being pressed by the earpiece 21 of the handset 20, thereby the telephone 100 is idle and awaiting a call.

Referring to FIG. 2 and FIG. 3, one end of the support 30 is fixed to the back of the base station 10 for supporting the base station 10, and the other end of the support 30 is placed on the flat surface 200. The support 30 can be rotated relative to the base station 10 to adjust an angle between the base station 10 and the flat surface 200.

One end of the angle adjusting mechanism 40 is received and fixed in the support 30. The other end of the angle adjusting mechanism 40 is connected to the mouthpiece bearing portion 12 of the base station 10. The angle adjusting mechanism 40 is used for adjusting an angle of the mouthpiece bearing portion 12 relative to the flat surface 200 when the support 30 is rotated, therefore ensuring the mouthpiece 22 of the handset 20 is held in the mouthpiece bearing portion 12 when the telephone 100 is not in use, and the hang-up button 111 is always able to function.

Figure 4:
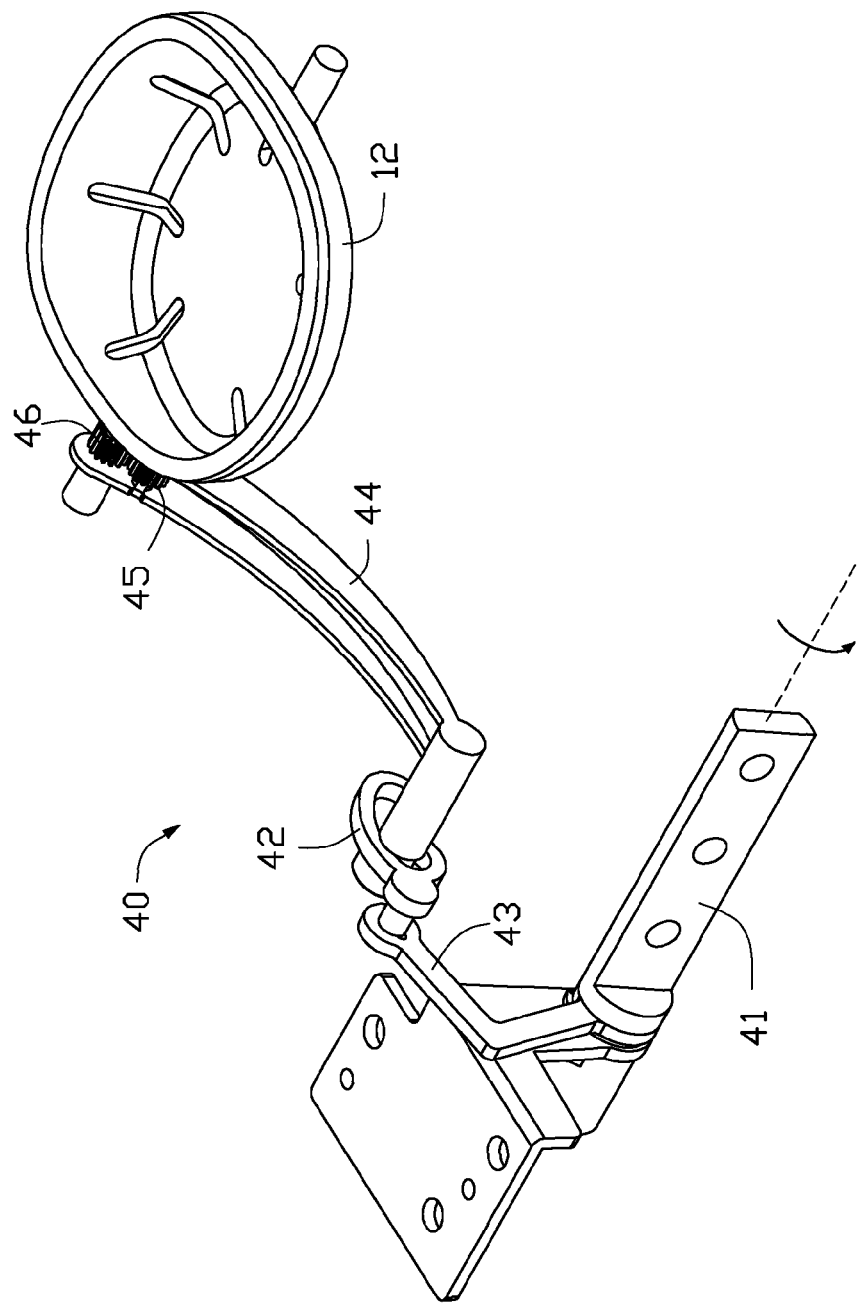
FIG. 4 illustrates an assembled, isometric view of an angle adjusting mechanism in accordance with an exemplary embodiment of the present disclosure.

Referring to FIG. 4, the angle adjusting mechanism 40 includes a hinge 41, a guiding member 42, a connecting member 43, a pushing member 44, and a driving medium. The driving medium includes a first wheel 45 and a second wheel 46. The hinge 41 and the guiding member 42 are fixed on opposite ends of the connecting member 43. The first wheel 45 is fixed on the pushing member 44. The second wheel 46 is fixed on the mouthpiece bearing portion 12. The second wheel 46 and the first wheel 45 are engaged with each other. One end of the pushing member 44 away from the first wheel 45 is slidably connected to the guiding member 42, and the other end of the pushing member 44 adjacent to the first wheel 45 is connected to the mouthpiece bearing portion 12 by the engagement between the first wheel 45 and the second wheel 46.

Figure 5:
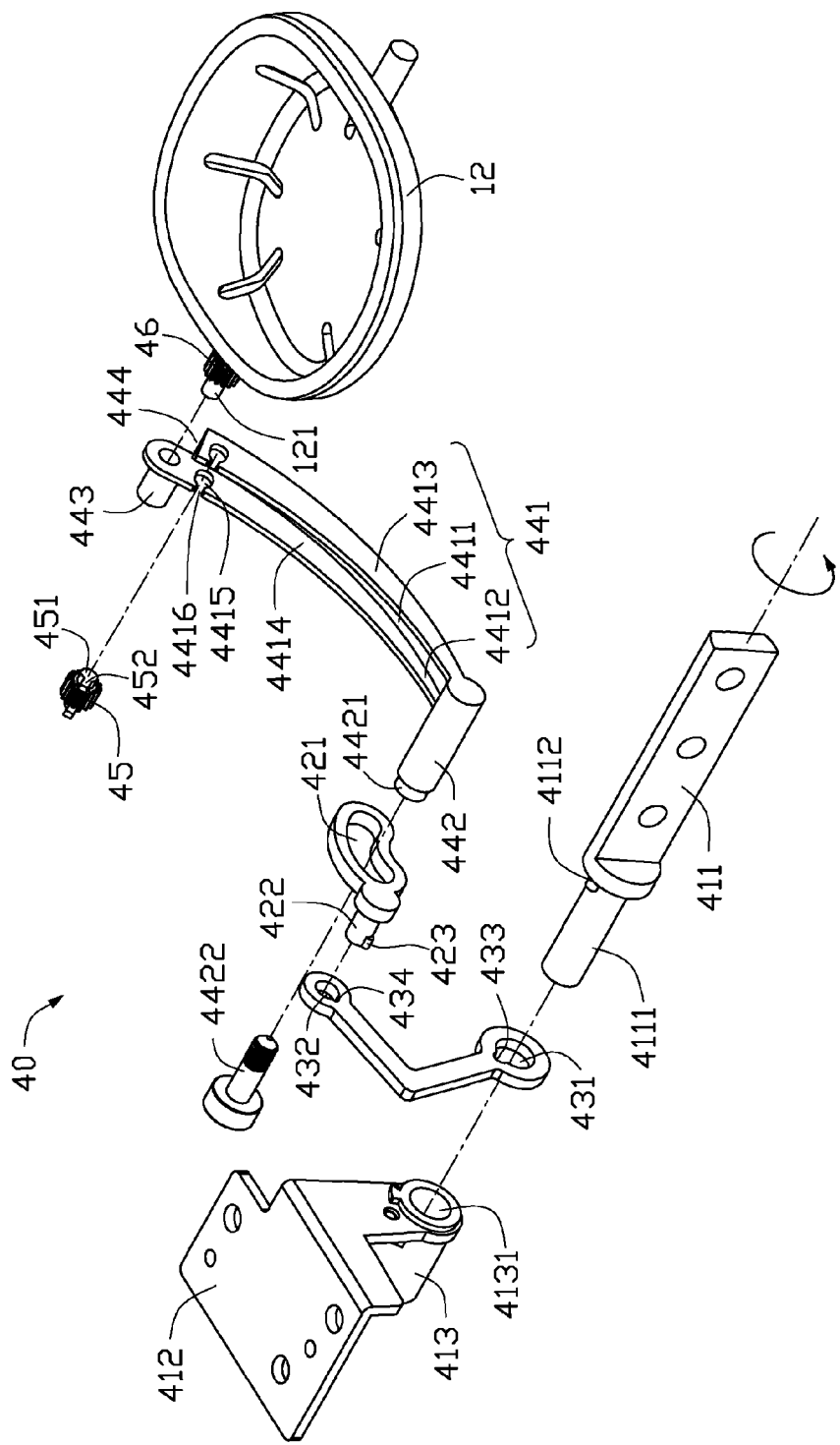
FIG. 5 illustrates an exploded, isometric view of the angle adjusting mechanism of FIG. 4.

Referring to FIG. 5, opposite ends of the hinge 41 are fixed in the base station 10 and in the support 30. The hinge 41 includes a rotational part 411, a fixed part 412, and an interconnecting part 413. The rotational part 411 has a rotational connection with the interconnecting part 413. The fixed part 412 is fastened in the base station 10. The interconnecting part 413 connects the rotational part 411 and the fixed part 412.

The rotational part 411 is fastened in the support 30. Specifically, an end of the rotational part 411 away from the interconnecting part 413 is fixed in the support 30. The rotational part 411 is turned when the support 30 is rotated. In this exemplary embodiment, the end of the rotational part 411 away from the connecting member 43 is substantially flat.

The rotational part 411 includes a first fixation element 4111 and a first fasten key 4112. The first fixation element 4111 and the first fasten key 4112 a connect and fix the connecting member 43. The first fixation element 4111 extends from an end of the rotational part 411. The first fixation element 4111 is adjacent to the interconnecting part 413. A free end of the first fixation element 4111 is received in the interconnecting part 413 in rotation. In this exemplary embodiment, the first fixation element 4111 is substantially cylindrical. The first fasten key 4112 is formed on the first fixation element 4111. Specifically, the first fasten key 4112 perpendicularly extends away from the periphery of the first fixation element 4111 adjacent to the rotational part 411. In this exemplary embodiment, the first fasten key 4112 is substantially semi-cylindrical.

In this exemplary embodiment, the fixed part 412 is a substantially flat bed. The fixed part 412 is fastened in the base station 10 to fix the hinge 41 in the base station 10. The fixed part 412 is adjacent to a bottom case of the base station 10.

The interconnecting part 413 is attached to the fixed part 412. The interconnecting part 413 is located at a side of the fixed part 412. In this exemplary embodiment, the interconnecting part 413 is substantially cylindrical. A receiving groove 4131 is defined on the interconnecting part 413. The receiving groove 4131 is recessed inwards from an end of the interconnecting part 413. The receiving groove 4131 is adjacent to the rotational part 411. The receiving groove 4131 faces the first fixation element 4111. The receiving groove 4131 is designed to match with the first fixation element 4111 to receive the first fixation element 4111. The first fixation element 4111 can be rotated in the receiving groove 4131. In this exemplary embodiment, the receiving groove 4131 is substantially a cylindrical groove.

Referring to FIG. 5, the guiding member 42 includes a ring groove 421. The ring groove 421 penetrates through the guiding member 42. In this exemplary embodiment, inner surfaces of the ring groove 421 are curved. Preferably, the inner surfaces of the ring groove 421 are roughened and not smooth.

The guiding member 42 further includes a second fixation element 422 and a second fasten key 423. The second fixation element 422 and the second fasten key 423 are used for connecting and fixing the connecting member 43. The second fixation element 422 is formed adjacent to the ring groove 421. In this exemplary embodiment, the second fixation element 422 is substantially cylindrical. The second fasten key 423 is formed on the second fixation element 422. Specifically, the second fasten key 423 perpendicularly extends from the periphery of the second fixation element 422. In this exemplary embodiment, the second fasten key 423 is substantially semi-cylindrical.

The connecting member 43 connects the hinge 41 and the guiding member 42. A first fixing hole 431 and a second fixing hole 432 are defined on opposite ends of the connecting member 43. The first fixing hole 431 and the second fixing hole 432 are respectively used for connecting the hinge 41 and the guiding member 42. In this exemplary embodiment, the connecting member 43 is substantially V-shaped. The first fixing hole 431 and the second fixing hole 432 are located at free ends of the V-shaped connecting member 43. The connecting member 43 further includes a first keyseat 433 and a second keyseat 434. The first keyseat 433 comprises of a recess in an inner surface of the first fixing hole 431. The second keyseat 434 comprises of a recess in an inner surface of the second fixing hole 432. In this exemplary embodiment, the first fixing hole 431 and the second fixing hole 432 are substantially circular, and the first keyseat 433 and the second keyseat 434 are substantially semi-circular. The shapes of such elements are not limited to those described.

During assembly, a free end of the first fixation element 4111 of the hinge 41 is inserted through the first fixing hole 431, and is further received in the receiving groove 4131 of the interconnecting part 413. The first fasten key 4112 of the hinge 41 is received in the first keyseat 433 and abut the interconnecting part 413. A free end of the second fixation element 422 of the guiding member 42 is inserted through the second fixing hole 432. The second fasten key 423 of the guiding member 42 is received in the second keyseat 434.

The pushing member 44 includes a main body 441, a slider 442, and a holding element 443. The slider 442 and the holding element 443 are formed on opposite ends of the main body 441. The slider 442 is adjacent to the guiding member 42. The holding element 443 is adjacent to the mouthpiece bearing portion 12.

The main body 441 includes a base board 4411, a first side wall 4412, and a second side wall 4413. The first side wall 4412 and the second side wall 4413 are formed on opposite sides of the base board 4411. In this exemplary embodiment, the base board 4411 is curved. The first side wall 4412 and the second side wall 4413 are parallel to each other. A width of the first side wall 4412 and the second side wall 4413 gradually decreases from the holding element 443 towards the slider 442. A top surface of the first side wall 4412 and the second side wall 4413 is curved. The base board 4411, the first side wall 4412, and the second side wall 4413 together define a cavity 4414. The cavity 4414 is used for receiving the first wheel 45.

The main body 441 further includes two location holes 4415 and two limiting holes 4416. The two location holes 4415 and the two limiting holes 4416 are used for fixing the first wheel 45. The two location holes 4415 are defined on the first side wall 4412 and the second side wall 4413. The two location holes 4415 are adjacent to the holding element 443. Each limiting hole 4416 is further recessed from a corresponding location hole 4415 away from the base board 4411. In this exemplary embodiment, each location hole 4415 is substantially cylindrical, and the limiting hole 4416 is substantially rectangular.

The slider 442 is connected to the guiding member 42. Specifically, the slider 442 is received in the ring groove 421 of the guiding member 42. The slider 442 slides along inner walls of the guiding member 42 when the support 30 is rotated. Specifically, a width of the ring groove 421 is constant. In other words, a distance between a top wall and a bottom wall of the ring groove 421 is always the same. In this exemplary embodiment, the slider 442 is a component of a thread 4421 and a coupled stud 4422.

The holding element 443 is connected to the mouthpiece bearing portion 12. The holding element 443 extends from the first side wall 4412 away from the second side wall 4413. The holding element 443 is hollow. An opening 444 is defined on the second side wall 4413. The holding element 443 faces the opening 444.

The first wheel 45 is positioned in the cavity 4414. The first wheel 45 includes two locating blocks 451 and two limiting blocks 452 beside the teeth of the first wheel 45. The two locating blocks 451 are positioned on opposite sides of the first wheel 45. In this exemplary embodiment, each locating block 452 is substantially cylindrical. Each limiting block 453 is formed on a locating block 452. Specifically, the two limiting blocks 452 extend in the same direction from the two locating blocks 452 which carry them. In this exemplary embodiment, each limiting block 453 is substantially cylindrical. The locating blocks 451 are received in the location holes 4415. The limiting blocks 452 are received in the limiting holes 4416 of the pushing member 44.

The second wheel 46 is fixed on the mouthpiece bearing portion 12 of the base station 10. The mouthpiece bearing portion 12 includes a spindle 121. The spindle 121 extends away from a side of the mouthpiece bearing portion 12. The second wheel 46 is fixed on the spindle 121. A free end of the spindle 121 passes through the opening 444 of the second side wall 4413 and is rotationally coupled to the holding element 443 of the first side wall 4412.

Figure 6:
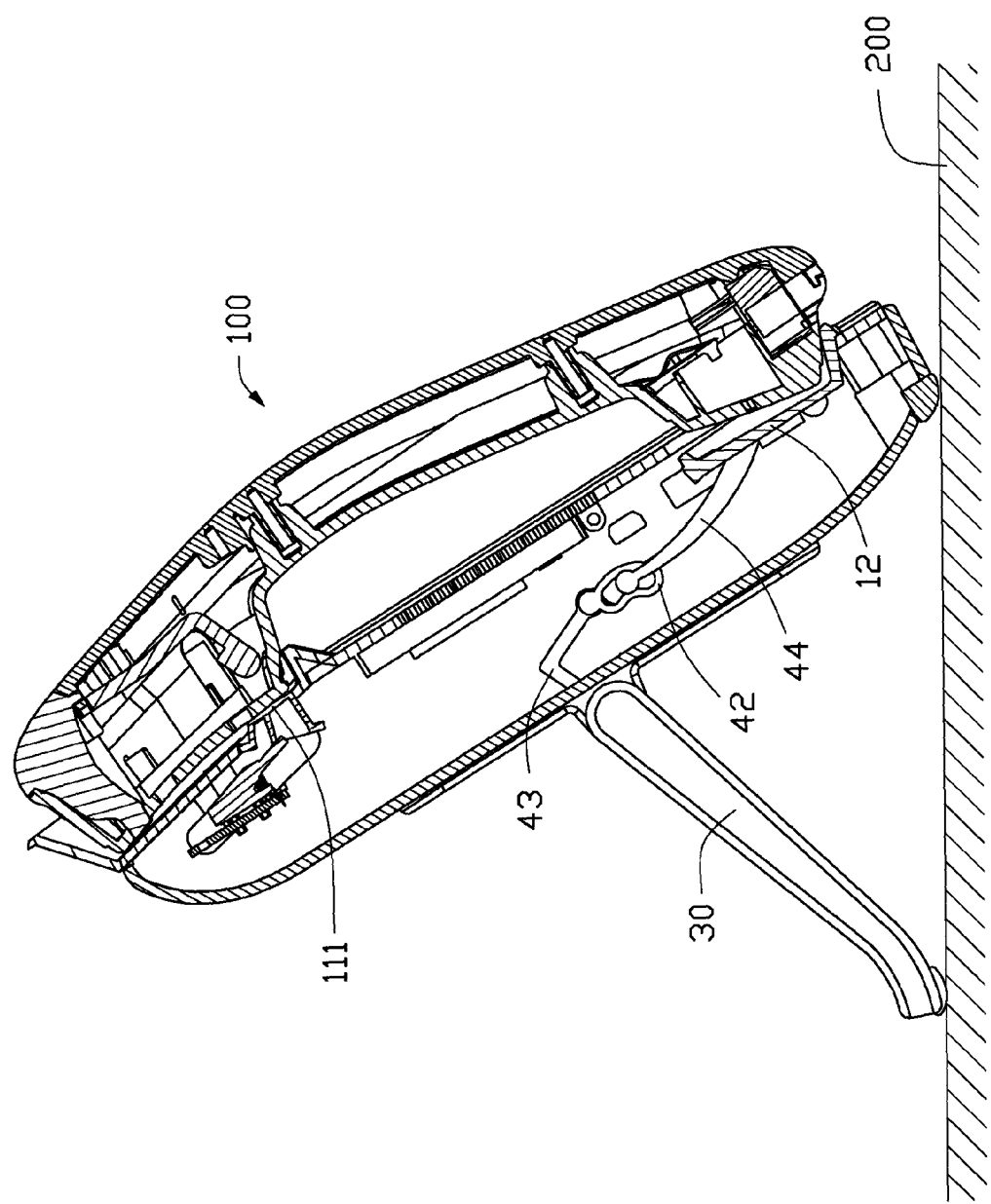
FIG. 6 illustrates a cross-section view of the telephone in FIG. 1, taken along a line VI-VI thereof after an angle of the telephone is adjusted.

Referring to FIGS. 3, 4, and 6, when the support 30 is rotated, an angle of the base station 10 relative to the flat surface 200 is changed. At the same time, the rotational part 411 of the hinge 41 is turned by the support 30. The connecting member 43 connected to the rotational part 411 is thus rotated. The guiding member 42 is rotated by the connecting member 43. When the guiding member 42 is rotated, the slider 442 of the pushing member 44 slides along the inner walls of the ring groove 421. The pushing member 44 is thus rotated and the position of the first wheel 45 is changed. The second wheel 46 is rotated by the first wheel 45. The mouthpiece bearing portion 12 is turned by the second wheel 46, thereby decreasing an angle of the mouthpiece bearing portion 12 relative to the flat surface 200. The angle of the mouthpiece bearing portion 12 relative to the flat surface 200 is adjustable in this way allowing the hang-up button 111 installed in the earpiece bearing portion 11 to be pressed by the handset 20 when a call is ended. The angle of the mouthpiece bearing portion 12 relative to the flat surface 200 remains substantially unchanged under the adjustment of the angle adjusting mechanism 40.

A combination of the first wheel 45, the second wheel 46, the connecting member 43, the guiding member 42, and the pushing member 44 achieves the purpose of maintaining an original orientation of the handset bed. At the same time, the hinge 41 rotates to turn the mouthpiece bearing portion 12, ensuring the angle between the mouthpiece bearing portion 12 and the flat surface 200 is enough to hold the mouthpiece 22 of the handset 20.

The embodiments shown and described above are only examples. Many details are often found in the art such as the other features of the angle adjusting mechanism. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. An angle adjusting mechanism for adjusting an angle of a mouthpiece bearing portion of a telephone, comprising:
   a hinge mounted in the telephone;
   a guiding member;
   a connecting member connecting the hinge and the guiding member;
   a pushing member slidably connected to the guiding member;
   a first wheel fixed on the pushing member and away from the guiding member; and
   a second wheel fixed on the mouthpiece bearing portion and engaged with the first wheel;
   wherein when the hinge is rotated to drive the connecting member and the guiding member to rotate, the pushing member slides in the guiding member to drive the first wheel to rotate, and the second wheel turns in response to the first wheel rotating, thereby rotating the mouthpiece bearing portion.

2. The angle adjusting mechanism of claim 1, wherein the hinge comprises:
   a rotational part connected to the connecting member;
   a fixed part fixed in the telephone; and
   an interconnecting part coupling the rotational part to the fixed part;
   wherein the rotational part has a rotational connection with the interconnecting part.

3. The angle adjusting mechanism of claim 2, wherein the interconnecting part is attached to the fixed part, a receiving groove is defined on the interconnecting part, and the receiving groove faces the rotational part.

4. The angle adjusting mechanism of claim 3, wherein the rotational part comprises a first fixation element extending from an end of the rotational part, the first fixation element is adjacent to the interconnecting part, and a free end of the first fixation element is received in receiving groove in rotation.

5. The angle adjusting mechanism of claim 4, wherein the rotational part further comprises a first fasten key formed on the first fixation element, the first fasten key perpendicularly extends away from a periphery of the first fixation element, and the first fasten key and the first fixation element connect to fix the connecting member.

6. The angle adjusting mechanism of claim 5, wherein a first fixing hole and a first keyseat are defined on the connecting member, the free end of the first fixation element is inserted through the first fixing hole, the first fasten key is received in the first keyseat and abuts the interconnecting part.

7. The angle adjusting mechanism of claim 1, wherein the guiding member comprises a ring groove, the ring groove penetrates through the guiding member, and an end of the pushing member away from the first wheel is received in the ring groove.

8. The angle adjusting mechanism of claim 7, wherein the guiding member further comprises a second fixation element, and the second fixation element is formed beside the ring groove.

9. The angle adjusting mechanism of claim 8, wherein the guiding member further comprises a second fasten key formed on the second fixation element, the second fasten key perpendicularly extends from periphery of the second fixation element, and the second fixation element and the second fasten key connect and fix the connecting member.

10. The angle adjusting mechanism of claim 9, wherein a second fixing hole and a second keyseat are defined on the connecting member, and a free end of the second fixation element is inserted through the second fixing hole, and the second fasten key is received in the second keyseat.

11. The angle adjusting mechanism of claim 7, wherein the pushing member comprises:
 a main body;
 a slider received in the ring groove of the guiding member; and
 a holding element connected to the mouthpiece bearing portion;
 wherein the slider and the holding element are respectively formed on opposite ends of the main body.

12. The angle adjusting mechanism of claim 11, wherein a distance between a top wall and a bottom wall of the ring groove is constant, and the slider slides along the top wall and the bottom wall of the guiding member.

13. The angle adjusting mechanism of claim 11,
 wherein the main body comprises a base board, a first side wall, and a second side wall, the first side wall and the second side wall are respectively formed on opposite sides of the base board; and
 wherein the base board, the first side wall, and the second side wall together define a cavity for receiving the first wheel.

14. The angle adjusting mechanism of claim 13, wherein the base board is curved, and a width of the first side wall and the second side wall gradually decreases from the holding element towards the slider.

15. The angle adjusting mechanism of claim 13, wherein the holding element is formed on the first side wall, and the holding element extends from the first side wall away from the second side wall.

16. The angle adjusting mechanism of claim 15, wherein an opening is defined on the second side wall, and the holding element faces the opening.

17. The angle adjusting mechanism of claim 16, wherein a spindle is configured on the mouthpiece bearing portion, the second wheel is fixed on the spindle, and a free end of the spindle passes through the opening of the second side wall to be received in the holding element.

18. The angle adjusting mechanism of claim 17, wherein the spindle extends away from a side of the mouthpiece bearing portion.

19. The angle adjusting mechanism of claim 13,
 wherein the main body further comprises two location holes, the two location holes are defined on the first side wall and the second side wall, the two location holes are adjacent to the holding element; and
 wherein the main body further comprises two limiting holes, each limiting hole is further recessed from a corresponding location hole away from the base board.

20. The angle adjusting mechanism of claim 19,
 wherein the first wheel comprises two locating blocks formed beside the teeth of the first wheel, the two locating blocks are received in the two location holes; and
 wherein the first wheel further comprises two limiting blocks, each limiting block is formed on a corresponding locating block, and the two limiting blocks are received in the two limiting holes of the pushing member.

* * * * *